March 29, 1966     A. J. McGEE, JR     3,242,994
TRIP PLOW OR CULTIVATOR

Filed June 19, 1964                             2 Sheets-Sheet 1

INVENTOR.
A. J. McGEE, JR.
BY
B. P. Fishburn, Jr.
ATTORNEY

March 29, 1966  A. J. McGEE, JR  3,242,994
TRIP PLOW OR CULTIVATOR
Filed June 19, 1964  2 Sheets-Sheet 2
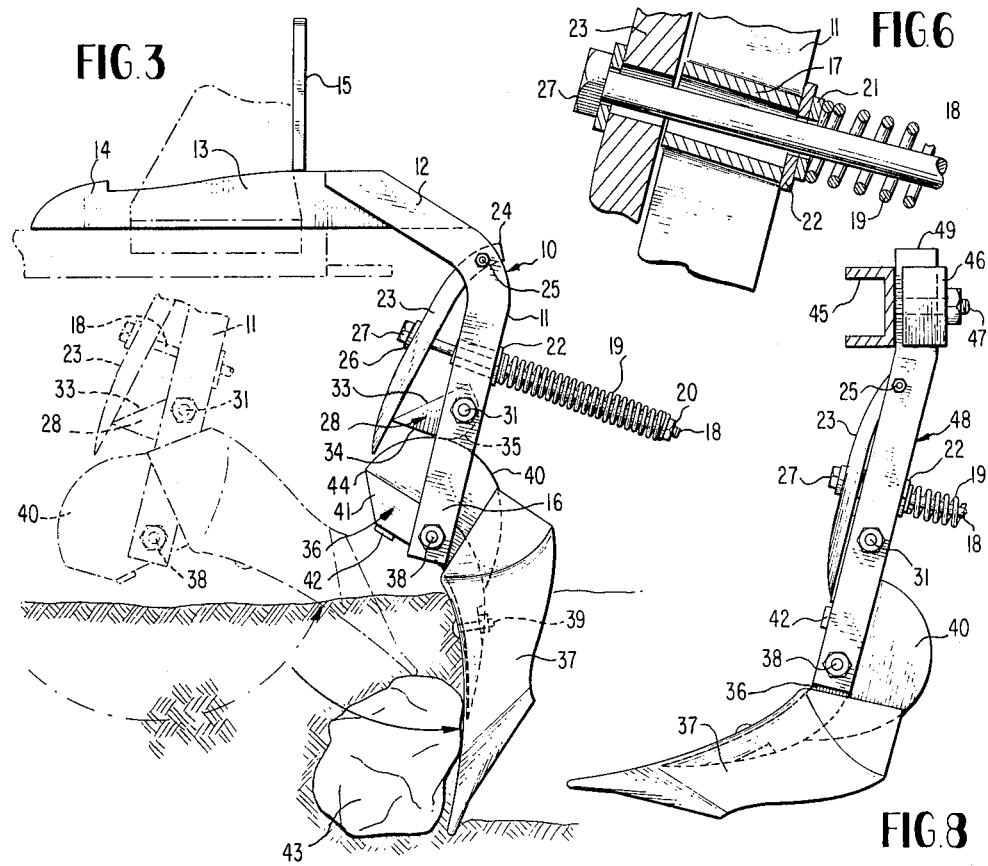
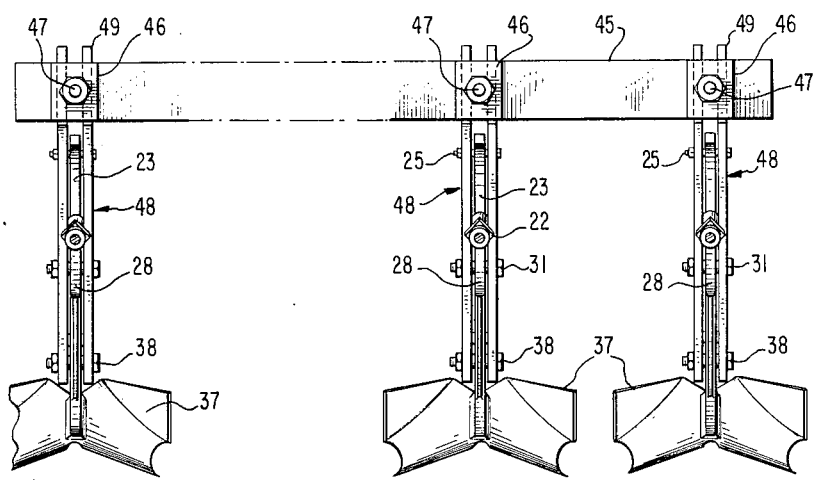
INVENTOR.
A. J. McGEE, JR.
BY
B. P. Fishburn, Jr.
ATTORNEY United States Patent Office 3,242,994
Patented Mar. 29, 1966

3,242,994
TRIP PLOW OR CULTIVATOR
Andrew J. McGee, Jr., Rte. 1, Coward, S.C.
Filed June 19, 1964, Ser. No. 376,374
7 Claims. (Cl. 172—265)

This invention relates to improvements in trip plows or cultivators.

The object of the invention is to provide a trip plow or plow standard which may be adapted to substantially any type tractor or tractor hitch and which is considerably more rugged and durable and more reliable and efficient in operation than the somewhat similar devices known to the prior art.

A further object of the invention is to provide a plow or implement standard including a resilient release or trip structure, which allows miximum swinging of the plow ploint relative to the standard, without damaging or breaking any of the parts, the structure being easy to resetby merely backing up the tractor without the necessity for the driver having to stop the tractor or dismount therefrom.

Another general object of the invention is to provide a trip plow having a minimum number of parts arranged in a simplified and novel manner to produce an improved mode of operation.

Other objects and advantages of the invention will be apparent to those skilled in the art during the course of the following description.

Figure 1:
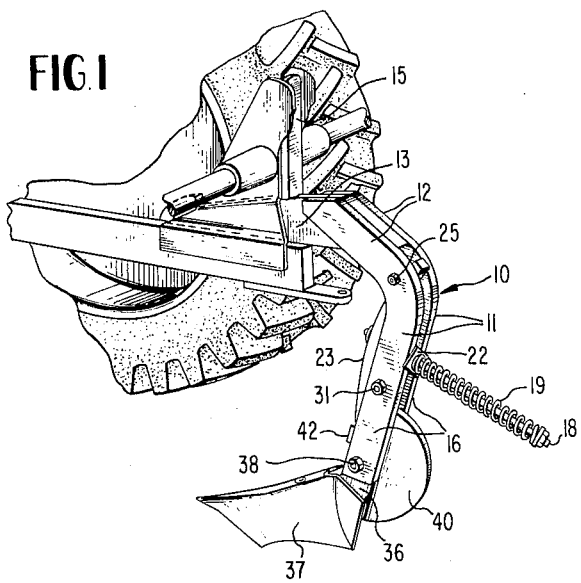
Figure 4:
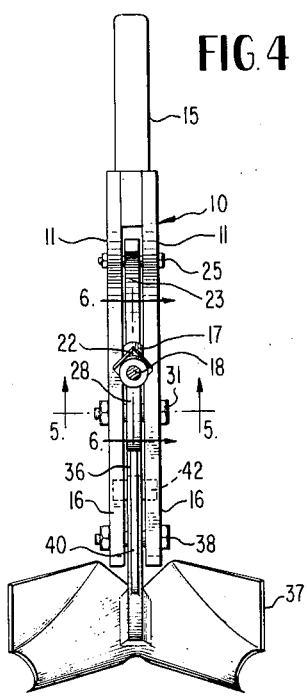
Figure 2:
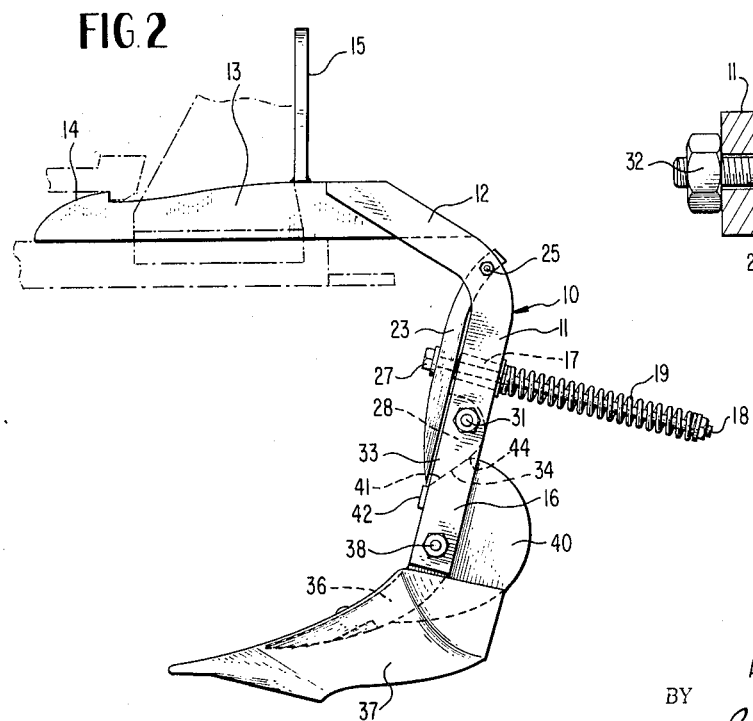
Figure 5:
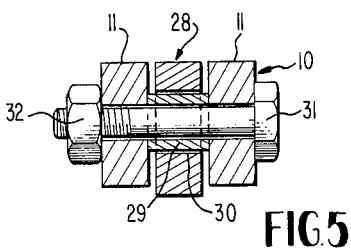

In the accompanying drawings forming a part of this application and in which like numerals are employed to designate like parts throughout the same, FIGURE 1 is a fragmentary perspective view of a trip plow or standard embodying the invention and showing the same connected with one well-known type of tractor hitch, FIGURE 2 is a somewhat enlarged side elevation of the invention shown in FIGURE 1, FIGURE 3 is a further side elevation of the invention showing the operation of the same upon encountering an obstruction in the ground, FIGURE 4 is a rear elevation of the invention, FIGURE 5 is an enlarged fragmentary horizontal section taken on line 5—5 of FIGURE 4, FIGURE 6 is an enlarged fragmentary vertical section taken on line 6—6 of FIGURE 4, FIGURE 7 is a rear elevational view showing a plurality of trip plows or cultivators embodying a modification of the invention, and FIGURE 8 is a side elevational view, partly in section, on an enlarged scale, of the invention as shown in FIGURE 7.

In the drawings, wherein for the purpose of illustration are shown preferred embodiments of the invention, attention is directed first to FIGURES 1-6 inclusive, wherein the numeral 10 designates generally the standard of my trip plow, including a pair of sturdy bars 11 arranged in spaced parallel relation and including upper forwardly inclined portions 12 which are welded to an intermediate generally horizontal hitch bar 13 having a forward latch extension 14 and an upstanding brace 15 rigid therewith. The standard 10 and the bar 13 rigid therewith constitute a generally L-shaped assembly, FIGURE 2, wherein the standard includes generally vertical bar portions 16 extending below the bend or elbow thereof, as shown.

As shown somewhat diagrammatically in FIGURES 1 and 2, the bar 13 and latch extension 14 are adapted to couple the trip plow to one well-known type of tractor hitch, namely, the "Farm-All Fast Hitch," manufactured by International Harvester Company, 180 North Michigan Ave., Chicago, Illinois. It should be emphasized here that the invention is not restricted in its use to any particular type of hitch or carrying structure and is readily adaptable to various types of tractors, tractor hitches, tool bars and the like.

With continued reference to the drawings, the standard 10 is provided intermediate its ends and between the bars 11 with a short sleeve 17, FIGURE 6, welded to to bars 11 and constituting an integral spacer between the same. The bore of sleeve 17 receives therethrough movably a long bolt 18 carrying a quite stiff compressible coil spring 19 on the portion thereof which projects rearwardly of the standard 10 and generally at right angles to the standard. The rear end of the bolt 18 carries a nut 20 and a suitable washer and this nut may be turned for adjusting the tension of the spring 19. The forward end of the spring 19 bears upon suitable washers 21 and 22, the washer 22 being a wide washer which engages the rear sides of the bars 11 of standard 10, as shown.

An elongated generally straight reaction lever 23 has its upper somewhat curved end 24 extending between the curved or elbow portions of the bars 11 and pivotally connected thereto by means of a suitable transverse pivot bolt 25, extending through the standard and the lever 23. The reaction lever 23 has a transverse through opening near its longitudinal center receiving the long bolt 18, forwardly of the standard 10, and a washer 26 bears upon the forward side of the lever 23, beneath the head 27 of the long bolt. The tension of the spring 19 constantly urges the reaction lever 23 to swing rearwardly upon its pivot 25 toward parallelism with the upright or vertical portion of the standard 10. The lever 23 may be urged forwardly or away from the standard 10 as shown in FIGURE 3 in a manner to compress the spring 19 by means now to be described.

An intermediate cam element 28 is disposed between the bars 11, near and below the fixed sleeve 17 and is pivotally mounted upon the standard as shown in FIGURE 5. A short spacer sleeve 29 is disposed between the bars 11 and is received by a through opening 30 of cam element 28 so as to pivotally support the latter. The spacer 29 prevents the bars 11 from ever having binding or gripping engagement with the cam element 28 which must be free for turning or pivoting. A transverse bolt 31 carrying a suitable nut 32 extends through openings in the bars 11 and through the bore of the spacer 29 to secure the parts as shown.

The intermediate cam element 28 has a long normally forwardly facing straight side 33 and a diverging substantially straight side 34, forming an acute angle therewith and blending into an arcuate rear portion 35 as shown in FIGURES 2 and 3.

Immediately below the intermediate cam element 28 and between the standard bar portions 16 is the pivoted base, support or carrier 36 for any desired type of plow point 37, plowshare or cultivator tooth. The carrier 36 is somewhat L-shaped or curved, as shown in the drawings, and is pivotally secured intermediate its ends to the lower end portion of the standard 10 by means of a connection which is identical to that above-described and shown in FIGURE 5. That is to say, there is a suitable pivot bolt 38 interconnecting the carrier 36 and the bar portions 16 and there is a spacer, not shown, substantially identical with the spacer 29 shown in FIGURE 5. This arrangement renders the carrier 36 freely pivotal upon the standard without any danger of the bar portions 16 clamping against or binding the carrier 36 during its operation.

The particular plow point 37, cultivator tooth or the like, may be detachably secured to the carrier 36 as by bolt means 39, or if preferred, the plow point may be rigidly secured to the carrier 36 permanently as by welding. In this connection, it is desired to emphasize that the trip mechanism constituting the essence of the invention is not limited for use with any particular type of plow point, share or cultivator tooth and various types of earthworking elements may be mounted on the pivoted carrier 36 within the scope of the invention. In this connection, the drawings are illustrative only and should not be read or understood in a limiting sense.

The body of the pivoted carrier 36 is preferably of the same width or thickness as the intermediate cam element 28. The carrier 36 includes on its rear side and integral therewith a relatively large circularly curved cam plate 40 of somewhat reduced thickness and having a peripheral edge concentric with the pivot element 38 and spanning more than a full 180 degrees of arc as shown. The arcuate edge of the cam plate 40 has sliding and rolling engagement against the intermediate cam element 28 during operation, as illustrated in FIGURE 3. The top of carrier element 36 is beveled rearwardly at 41 to interfit with the straight edge 34 of cam element 28 when the plow is in the latched or non-tripped position shown for example in FIGURE 2.

Near its upper end, the carrier 36 has a cross piece 42 constituting a stop secured thereto by welding or the like. When the device is in the non-tripped position, FIGURE 2, the element 42 engages the forward sides of bars 11 to positively limit the return movement or clockwise movement of the carrier 36 upon the pivot element 38. The element 42 does not interfere with turning movement in the opposite direction on the pivot element 38.

With the tension of the spring 19 properly adjusted as desired, the entire implement is hitched to the tractor in the manner shown and the parts are normally arranged as depicted in FIGURES 1 and 2 for forming a middle-buster plow or the like. When, during plowing, a heavy obstacle such as a rock 43, FIGURE 3, a stump or the like is encountered, the plow will trip or release in the manner shown in FIGURE 3 to permit the plow point 37 to pass easily over the obstruction without damaging or breaking any of the parts.

As shown in FIGURE 3, when the obstacle is encountered, the plow point and carrier 36 immediately turn counterclockwise upon the pivot element 38 and the beveled face 41 initially acts upon the straight edge 34 of intermediate cam element 28 and begins to turn the intermediate cam element in the clockwise direction upon its pivot 31. Continued forward movement of the tractor causes the circularly curved edge of cam plate 40 to slidably engage the intermediate cam element 28 in the manner shown in FIGURE 3 and this substantially tangential engagement between the two cam faces allows the carrier 36 and point 37 to turn as far in the counterclockwise direction as is necessary to allow passage over the obstacle 43. At this time, and as soon as the obstacle is encountered by the plow, the spring-urged reaction lever 23 is constantly resisting the clockwise turning of the intermediate cam element 28 and tending to return this element to the normal position shown in FIGURE 2. However, the effect of the lever 23 on the intermediate cam element 28 does not return the carrier 36 to the normal or latched position shown in FIGURE 2 automatically. This is done after the obstruction is passed over by backing-up the tractor a short distance while the plow point is lightly engaged with the ground. When this is done, the carrier 36 will begin to turn clockwise upon the pivot element 38 and when the upper corner 44 of the carrier 36 passes over the cam element 28, the parts will return to the condition shown in FIGURE 2 with a quick snap action under influence of the spring 19 and associated parts.

A considerable adjustment on the parts is available by the use of the nut 20 to regulate the tension of the spring 19. The plow can be rendered quite stiff so that it will not trip until a sufficiently heavy obstacle is encountered, or the tripping action can be rendered somewhat more sensitive, if desired. The construction is very sturdy and embodies few parts and the device is reliable and efficient in operation.

FIGURES 7 and 8 of the drawings show a slight modification of the invention to illustrate the fact that the invention trip mechanism may be embodied in various types of hitches or support structures. In FIGURE 7, for example, a tool bar 45 of any preferred type adapted to be carried by a tractor is shown supporting or mounting a plurality of the invention units, connected therewith by suitable clamp and bolt means 46 and 47. Each of the invention units shown embodies a modified type of standard 48 which corresponds broadly to the previously-described standard 10, except that the standard 48 is not generally L-shaped but is generally straight or vertical. Each standard 48 includes a short upper vertical extension 49 to receive the clamping means 46 and tool bar 45 in the manner shown. The portion of the standard 48 below the tool bar 45 is substantially identical to the first form of the invention and all other parts including all of the latch and release structure previously described is identical to the first form of the invention and need not be described again herein. The mode of operation of the form of the invention shown in FIGURES 7 and 8 is also identical to that described above in connection with the first form of the invention. In accordance with FIGURES 7 and 8, any number of trip plows, cultivator units or the like may be mounted upon a common tool bar and various types of plow points or cultivator teeth may be utilized with the invention. When rocks, stumps or the like are encountered in the ground, the individual plow units on the tool bar will trip and pass over the obstructions in the manner shown and described for the first form of the invention. The invention is therefore applicable to various forms of mountings and hitches as shown now be obvious without the necessity for further description.

It is to be understood that the forms of the invention herewith shown and described are to be taken as preferred examples of the same, and that various changes in shape, size and arrangement of parts may be resorted to, without departing from the spirit of the invention or scope of the subjoined claims.

Having thus described my invention, I claim:

1. A trip plow or the like comprising a standard adapted to be transported by a moving vehicle and including a generally vertical portion, an earthworking element pivoted to the bottom of the generally vertical portion of the standard and including a circularly curved cam part and a stop element adapted to engage the forward side of the standard to limit turning of the earthworking element in one direction, an intermediate cam element pivoted to the standard above the pivoted earthworking element and having converging straight edges and a rounded edge portion for substantial sliding engagement with the circularly curved cam part of the earthworking element, an elongated reaction lever pivoted to the standard above said intermediate cam element and bearing directly upon the same, and resilient means interconnecting the standard and reaction lever and urging the latter in one direction to in turn urge the intermediate cam element to turn in one direction upon its pivot.

2. A trip plow or the like comprising a standard having a main bifurcated portion, means on the upper end of the standard adapting it for connection with mobile carrier means, an earthworking element pivoted to the lower end of the standard and extending therebelow and forwardly thereof when in the earthworking position, the earthworking element including a circularly curved cam part between the side walls of the bifurcated standard, a stop element carried by the earthworking element above the pivot thereof engageable with the forward side of the standard to arrest turning of the earthworking element in one direction, the earthworking element having a beveled face at its top end between said side walls and forwardly of the cam part, an intermediate cam element pivoted between the side walls of the bifurcated standard above the earthworking element and having a rear straight face to engage said beveled face and a forward straight face which is then substantially parallel to the standard near the front side thereof, and a spring-loaded reaction lever pivoted between the side walls of the standard near the top thereof and having a longitudinal face adapted to abut the forward straight face of the intermediate cam element when such is parallel to the standard, engagement of the earthworking element with an obstruction during forward movement thereof causing said cam part to turn in one direction upon the standard, in turn causing the intermediate cam element to turn in the opposite direction, said reaction lever yieldingly resisting said turning of the intermediate cam element.

3. In a trip plow, a standard adapted for connection with tractor hitch means, an elongated reaction lever pivoted to the standard near the upper ends of the reaction lever and the standard so that the reaction lever may extend approximately parallel to the standard adjacent the forward side thereof for a major portion of the length of the standard, an adjustable spring device interconnecting the reaction lever and standard near the longitudinal center of the reaction lever and generally at right angles thereto and to the standard and constantly urging the reaction lever toward said standard, a tapered intermediate cam element pivoted to the standard near the lower end portion of the reaction lever and including a corner adapted to cammingly engage the reaction lever and shift the same forwardly of the standard against the force of the spring device, an earthworking carrier pivoted to the standard near the bottom thereof and extending above and below said bottom, an earthworking element on said carrier, and a cam on the upper portion of the carrier engageable with the intermediate cam element to urge said corner into camming engagement with the reaction lever and allowing the carrier and earthworking element to turn relative to the standard substantially any required distance to enable the earthworking element to pass an obstruction.

4. The invention as defined by claim 3, and wherein the intermediate cam element and said cam have engageable arcuate faces adapted to slide while engaged.

5. A trip plow structure comprising a standard body portion, a reaction lever pivoted to the standard body portion and swingable toward and away from the same, an adjustable spring means interconnecting said lever and body portion and resisting movement of the lever away from the body portion, a first cam element pivoted to the body portion independently of the lever and engaging the lever to force the same away from the body portion when turned in one direction, a second cam element engaging the first cam element and pivoted to the body portion and causing turning of the first cam element in said one direction when the second cam element is turned in an opposite direction on said body portion, and an earthworking element bodily carried by the second cam element and causing turning of the second cam element upon encountering an obstruction during forward movement of the trip plow.

6. The invention as defined by claim 5, and an element forming a stop on the second cam element engageable with the body portion to positively limit turning of the second cam element in a reverse direction.

7. The invention as defined by claim 5, and wherein said spring device comprises a sleeve on the body portion, a bolt extending through said sleeve and connected with said lever, and a spring on said bolt bearing against the body portion, and an adjusting nut on said bolt engaging said spring.

No references cited.

ABRAHAM G. STONE, *Primary Examiner.*